Oct. 20, 1959 A. B. SMEDLEY 2,909,587
EMERGENCY POWER UNIT
Filed Nov. 15, 1955
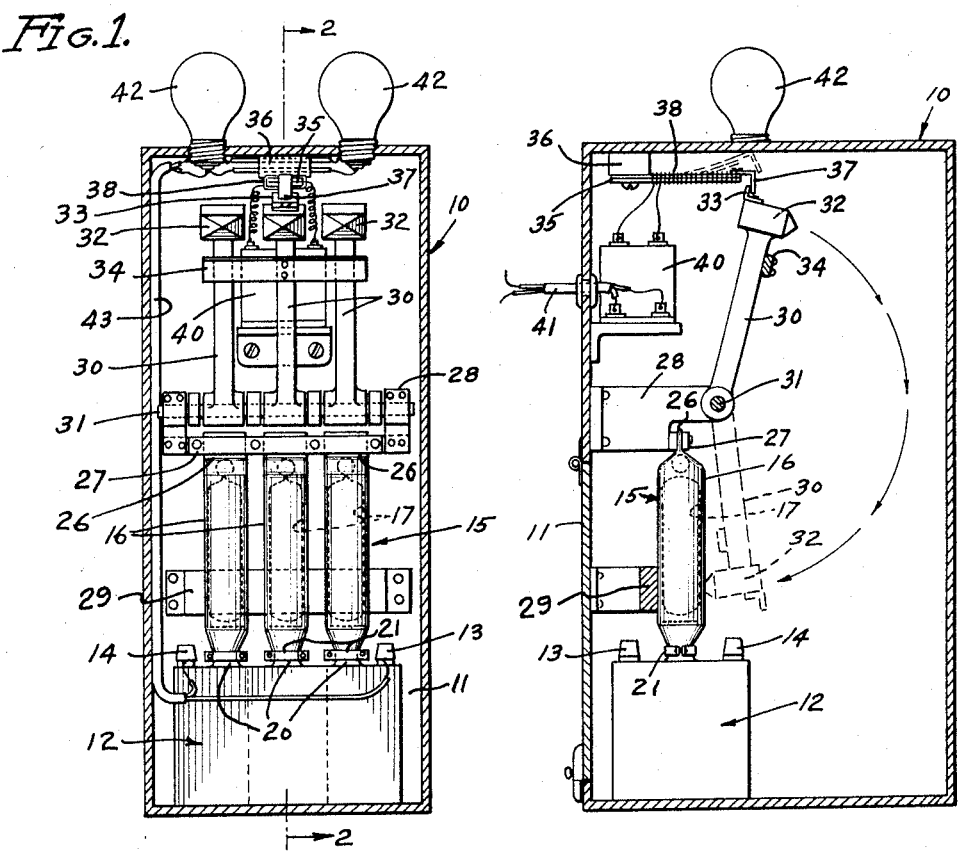
Fig.1.
Fig.2.
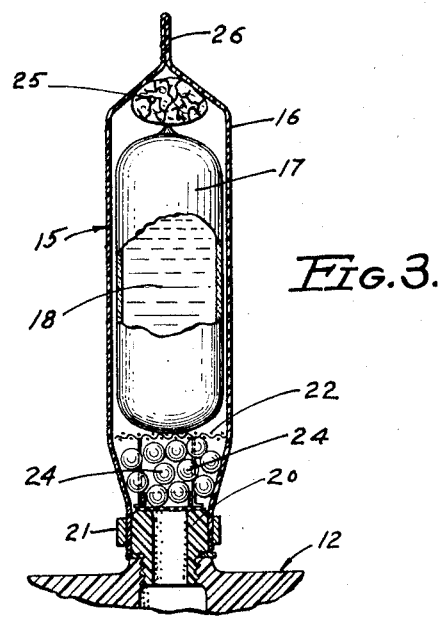
Fig.3.
ANDERSON B. SMEDLEY,
INVENTOR.
BY
AGENT 2,909,587

EMERGENCY POWER UNIT

Anderson B. Smedley, Altadena, Calif.

Application November 15, 1955, Serial No. 546,999

4 Claims. (Cl. 136—112)

This invention finds general utility in the field of emergency power units and relates specifically to a standby source of electrical energy adapted for manual or automatic energization, as may be required in particular emergency situations, for example.

Heretofore, it has been common practice, to cite one example, to connect emergency lighting and other power leads ahead of main fuses in order that emergency circuits, which are generally separate and distinct electrical circuits, will not be extinguished in the event of blown fuses. In building structures, it has been required that emergency circuits be installed in separate conduits in order to eliminate the possibility of failure thereof in the case of normal main lighting circuit failures. It has not always been possible to enforce these requirements in older buildings.

More particularly, contemporary civil defense requirements dictate the necessity for provision of emergency lighting devices having the ultimate in reliability. For example, in civil defense shelter areas, where crowding of people may create near-panic conditions, it is absolutely essential that light be available, at least for a sufficient length of time to maintain order and enable adequate disposition of supplies, allocation of beds and the like and other factors.

Furthermore, it has been the general practice, especially in hospitals or the like, to provide standby diesel or gasoline driven generators with automatic throwover arrangements to this emergency power plant, in the event of main power failures. In some instances, such as in operating rooms, a standby storage battery has been used to provide light in the event of power failure, since it requires some seconds or minutes to initiate the standby generating unit regardless of either manual or automatic operation. In industry, elaborate separate emergency light and power equipment is provided utilizing central standby units, augmented in some instances by storage battery trickle charger units and automotive spot or floodlight units to light passageways and aisles. All of these heretofore known methods of providing standby emergency power have had serious shortcomings.

Emergency lighting ahead of the main fuses leaves the premises without emergency lights should the main power supply be interrupted. Such may be the case in the event of fires, storms, earthquakes, bombings, explosions, traffic accidents or other situations causing main line failures. Standby generator plants have depended upon starting batteries in good condition and upon periodic operation and inspection by trained personnel. In the case of the battery, it is not sufficient to maintain a full charge therein as most batteries will deteriorate in a few years and cannot perform starting duties unless periodic discharge and recharge cycles are carried out to maintain the activity of the plates. Only in rare instances is maintenance of this type carried out since such maintenance requires the services of an expert battery technician and periodic replacement of the battery to assure reliability thereof. The unit type storage battery and trickle chargers therefor often fail either initially to light or, being lighted, fail to give light for a sufficient time required in emergencies. Battery plates become dormant even at full charge, constant trickle charging evaporates the battery water which requires replacement, acid fumes may affect emergency relays and contacts and other factors, including operation of the standby equipment only under emergency conditions, prohibits the use of a normal storage battery with the required maintenance often being neglected.

Still further, a centralized emergency system is vulnerable to many hazzards and cannot be depended upon for safe emergency lighting; earthquakes, bombings, explosions, and fires often destroy the separate emergency circuits as well as the main circuits at points within factories and the like, thus to extinguish emergency and exit lighting in all parts of the factory.

With heretofore known emergency lighting circuits, and the like, another serious problem exists relative to the lack of competent trained personnel to maintain any form of emergency or exit lighting, as may be found in large well staffed industrial organizations. This weakness, therefore, pyramids upon the fundamental weakness of all such methods in common use, good examples being the rest home, church and smaller hotel where the potential danger is the greatest and compliance with existing regulations and requirements of maintenance of emergency of equipment is at a minimum.

The present invention, accordingly, aims at solving these heretofore known problems by provision of an emergency power unit having the utmost in reliability and requiring no attention or maintenance over a period of many years. The invention makes use of dry cell storage batteries, commonly referred to as desiccated batteries, that are stored without electrolyte in the cells. The plates of these batteries are fully charged but do not deteriorate nor lose their charge as long as they are maintained in a dry condition. When electrical energy is needed, electrolyte may be introduced in a few seconds with the battery thereafter being immediately available to deliver full power. The invention, therefore, makes use of the principle of combining with a desiccated battery, a means to seal the battery and to store electrolyte, either within the battery itself or by means of an external container that may be directly connected to the battery case and the cells or remotely located from the cells and connected thereto by means of conduits. Means are provided as a portion of the combination, to release the electrolyte into the battery cells which may be accomplished through the use of valves, diaphragms, breaking or cutting of containers, dissolving of seals or otherwise destroying the sealed condition of the electrolyte containers. This action may be accomplished either manually or automatically by various known relay systems. In this connection, it is important that any automatic mechanisms employed to interrupt the sealed condition of electrolyte containers be constructed in a manner whereby corrosion, infestation by animals or insects or existence of dust or the like will not destroy or affect reliable operation thereof. It is preferable that switches and relays be eliminated from the emergency battery circuit although such devices may be utilized, if desired in particular situations, without departing from the spirit and scope of this invention.

It is accordingly one important object of the present invention to provide a novel emergency power unit.

It is another important object of the present invention to provide an emergency power unit including a desiccated battery and means for either manually or automatically introducing electrolyte to the battery.

It is a further object of the invention to provide a standby emergency power unit that requires no attention or maintenance over long periods of time.

Still another object of the invention is to provide an emergency power unit including a desiccated battery, a supply of electrolyte, means to support the electrolyte in association with the battery and means automatically or manually to effect delivery of the electrolyte to the cells of the battery.

A still further object of the invention is to provide novel means for supporting electrolyte in combination with a desiccated battery and to maintain areas surrounding the electrolyte and the cells of the battery in a dry condition as well as providing an indication of any failure in maintenance of this dry condition.

Other and further important objects of the present invention will become apparent from the disclosures in the following detailed specification, appended claims and accompanying drawing, wherein:

Figure 1 is a front elevational view, with portions in section, of the emergency power unit of the present invention;

Fig. 2 is a transverse sectional view taken substantially as indicated by line 2—2, Fig. 1; and Fig. 3 is an enlarged fragmentary sectional view showing a means for supporting a quantity of electrolyte in association with cells of a desiccated battery.

With reference to the drawing, the device of this invention is shown in one preferred embodiment thereof and includes a generally rectilinear housing 10, having an access door 11 on one side thereof. A desiccated battery, indicated generally at 12, is disposed within a lower portion of the cabinet or housing 10, with this battery including a plurality of cells and usual pole pieces 13 and 14. In this connection, it is to be understood that while the battery illustrated is shown as having three distinct cells, single or multiple cell batteries may be employed as may be required in particular situations.

As shown, means are provided to support electrolyte in operative association with the various cells of the battery 12. This means is shown as indicated generally at 15, Fig. 3, and includes a support container 16 which may be made from any non-porous, generally flexible material, as for example, some forms of plastic or specifically, a polyethylene material. An electrolyte container 17 is positioned within the support container 16, the container 17 being preferably of frangible material such as glass, or the like, and permanently sealed to retain a quantity of electrolyte material indicated at 18. The particular configuration of the electrolyte container 17 may vary considerably depending upon various requirements, may be filled in any suitable manner as by complete liquid filling or with a partially air or gas content, thus to maintain pressure on the electrolyte 18. Additionally, physical pressure may be employed by means of springs and pistons or the like, if desired. The particular configuration of the container 17 may further include breakable tips or reduced diameter sections in order that physical force required for providing a means for breaking a seal may be maintained at a minimum.

The lower ends of the support containers 16 are secured to filling necks 20 of the battery 12 and may be clamped thereon by means of suitable clamping structures 21. Additionally, the support containers 16 have positioned in the lower portion thereof between a lower end of the electrolyte 17 and the necked portion of the battery, a plurality of chips or relatively large objects such as for example, glass spheres 24. The strainer 22 together with the spheres 24, serve to prevent introduction of any broken portions of the container 17 into the cells of the battery 12 when the container 17 is broken. Furthermore, the support containers 16 may be provided, in the upper portions thereof, with a quantity of a drying agent at 25. The drying agent 25 may be of any suitable material such as, for example, silica gel which serves to maintain the space within the support containers 16 surrounding the electrolyte container 17 and the cells of the battery 12, in a desiccated condition. Material of this type may also serve, usually by a change in color thereof, to indicate the existence of undesirable moisture within the containers 16 or the cells of the battery.

Maintenance of the battery in an absolutely dry condition is very important for long life thereof and required electrical charge. The use of the polyethylene support containers 16 serves, due to the flexibility thereof, to permit expansion and contraction due to various changes in ambient atmosphere pressure. This funtcion eliminates any problems relative to any tendency for the container to "breathe" and destroy the dry sealed condition within the support containers and the cells of the battery.

Upper portions of the support containers 16 may be flattened as at 26 for retention in a clamp 27 that is carried by a bracket 28, which is in turn depended from a wall of the housing 10. The support containers and the electrolyte containers positioned therein, are thereby supported in a manner associated with the battery 12 whereby gravitationally or by pneumatic or physical force to deliver the electrolyte to the cells of the battery upon destruction of seals of the electrolyte containers.

The bracket 28 also serves pivotally to support a plurality of hammers 30 that have one of their ends journalled on a transverse shaft 31 that is supported by the bracket 28. The journals of the hammers 30 are preferably constructed with considerable tolerance with respect to the shaft 31, in order that corrosion, infestation by dust, animals or insects, will not affect pivotal action of the hammers on the shaft, even though the device may remain dormant and unused for many years. Each of the hammers 30 is provided with a weighted head portion 32. The hammers 30 are positioned and normally maintained in an uppermost position, as shown by the solid lines in the drawing and may be released as by any known means to gravitate in an arc, the construction being such that the heads 32 of the hammers 30 will strike preferably lower portions of the electrolyte containers 17 through the flexible support containers 16 to destroy the seal of the electrolyte containers. The latter position of the hammers 30 is shown by the dotted lines in Fig. 2.

As the hammer heads 32 strike the filling units 15, the filling units may be backed up with a suitable anvil 29 which extends across rearward surfaces of the filling units and is supported by and connected to a portion of the housing 10 or to the access door 11 thereof.

The hammers 30 may be supported in their uppermost position by means of a latch defined by the angle member 33 connected to the centermost of the hammers 30, there being a transverse bar 34 also connected to the centermost hammer 30 and disposed across the longitudinal surfaces of the outermost of the hammers. In this connection, it is to be understood that individual supports may be provided for each of the hammers 30 in order that equal striking force may be had upon release thereof. While the particular means for releasing the hammers 30 is a matter of choice in particular installational situations, one means includes a bimetallic element 35 supported on a bracket 36 that is depended from the housing 10. An outer end of the element 35 is adapted to support a catch member 37 which cooperates with the angle member 33. The bimetallic element 35 has wound thereabout a heating element 38 having leads that extend from a transformer 40. The transformer 40 may be connected, by way of leads 41, to a main lighting circuit that may fail and serves to heat the bimetallic element whereby to dispose this element and the catch member 37 thereof in a downward position as indicated by the solid lines in Fig. 2.

Upon failure of the main power circuit to which the leads 41 are connected, heating of the element 35 will be discontinued whereby to permit cooling and deflection thereof to the dotted line position of Fig. 2 and associated release of the hammers 30. Accordingly, slight delay is provided during the cooling period of the element 35, in order that the present emergency unit will not be initiated when only slight or very short interruptions in main power supplies are experienced. In this connection, the hammers 30 may be released by relay operated latch arrangements or may be manually tripped, if desired.

For provision of ordinary emergency light, one or more electric bulbs or the like, as indicated at 42, may be mounted in upper portions of the housing 10 and connected, by way of a cable 43, with the pole pieces 13 and 14 of the battery 12. Connection of the bulbs 42 with the battery 12 are preferably of a permanent nature with soldered joints in order that any deterioration encountered over long periods of time will not affect operating characteristics thereof. The cable 43 may also be either directly or remotely connected to downlights or exit signs, as desired. As shown and described in this particular specific embodiment of the invention, the main or emergency source to which the leads 41 are connected is continuously energized as required in cases of exit lights and the like. Obviously, the present device may be utilized in connection with the other types of circuits, if desired.

While several emergency lights may be operated from one emergency power unit, such is generally not advisable for maximum reliability, due to the necessity for wiring which may conceivably be damaged between the location of the battery unit and the remote point. As in the use of fire extinguishers and the like, it is appreciated that an item of expense is involved in connection with the replacement of the battery 12 and the electrolyte filling units 15 following existence of emergencies and use thereof. Such emergencies are generally extremely infrequent and justify the small expense amortized over considerable periods of time, to maintain a reliability that present methods cannot provide.

While the present device has been defined as providing emergency lighting, it is also to be understood that another important function of the present device resides in the provision of emergency power utilized for starting gasoline or diesel engine driven standby generating units. In these instances, periodic testing of the gasoline or diesel units are carried out with an ordinary automotive battery; however, in the event of an actual power failure, a sensing device will place the emergency battery and filler unit of the present invention in operation in parallel with the regular starting battery. Since the regular battery deteriorates in standby use and the emergency unit does not, it matters very little what condition the regular starting battery is in at the time of an emergency, since the emergency unit will be at full power at that exact instant.

It may thus be seen that an emergency power unit is provided having the ultimate in reliability over long periods of time. It is indicated that desiccated batteries have a shelf life of as long as twenty years or more and still retain full electrical charge until such time as electrolyte is induced therein, providing they are maintained in an absolutely dry condition. The present arrangement may be installed by laymen and requires no expert personnel for service, repair or other maintenance thereof.

Having thus described the invention and the present specific embodiment thereof, it is desired again to emphasize the fact that many modifications and changes in specific details of construction may be resorted to in a manner only limited by a just interpretation of the following claims.

I claim:

1. An emergency electrical power unit comprising, in combination: a housing; a desiccated battery positioned in a lower portion of said housing; panel means for providing access to said battery through said housing; a plurality of necked filling openings on said battery; flexible support containers having lower ends secured to each of said necked openings; bracket means for supporting lower ends of said support containers; frangible electrolyte containers positioned within said support containers; a plurality of hammers; means for supporting said hammers for pivotal movement in said housing, said hammers being adapted for gravitational pivotal movement about said supporting means therefor, first to strike said support containers and through said support containers to strike said electrolyte containers whereby to break at least portions of said electrolyte containers, electrolyte from said broken electrolyte containers being retained in said support containers; latch means for retaining said hammers in an uppermost position; and means responsive to failure of normal power supplies for releasing said latch means, said battery being thereby automatically filled with electrolyte from said support containers to provide an immediate source of electrical energy.

2. An emergency electrical power unit comprising, in combination; a housing; a desiccated battery positioned in a lower portion of said housing; panel means for providing access to said battery through said housing; a plurality of necked filling openings on said battery; flexible support containers having lower ends secured to each of said necked openings; bracket means for supporting lower ends of said support containers; frangible electrolyte containers positioned within said support containers; a drying agent contained within each of said support containers; a plurality of hammers; means for supporting said hammers for pivotal movement in said housing; said hammers being adapted for gravitational pivotal movement about said supporting means therefor, first to strike said support containers and through said support containers to strike said electrolyte containers whereby to break at least portions of said electrolyte containers, electrolyte from said broken electrolyte containers being retained in said support containers; latch means for retaining said hammers in an uppermost position; and means responsive to failure of normal power supplies for releasing said latch means, said battery being thereby automatically filled with electrolyte from said support containers to provide an immediate source of electrical energy.

3. An emergency electrical power unit comprising, in combination; a housing; a desiccated battery positioned in a lower portion of said housing; panel means for providing access to said battery through said housing; a plurality of necked filling openings on said battery; flexible support containers having lower ends secured to each of said necked openings; bracket means for supporting lower ends of said support containers; frangible electrolyte containers positioned within said support containers; strainer means in said support containers adjacent said lower ends thereof for preventing transfer of particles of said electrolyte containers into said battery; a plurality of hammers; means for supporting said hammers for pivotal movement in said housing, said hammers being adapted for gravitational pivotal movement about said supporting means therefor, first to strike said support containers and through said support containers to strike said electrolyte containers whereby to break at least portions of said electrolyte containers, electrolyte from said broken electrolyte containers being retained in said support containers; latch means for retaining said hammers in an uppermost position and means responsive to failure of normal power supplies for releasing said latch means, said battery being thereby automatically filled with electrolyte from said support containers to provide an immediate source of electrical energy.

4. An emergency electrical power unit comprising, in combination; a housing; a desiccated battery positioned in a lower portion of said housing; panel means for providing access to said battery through said housing; a plurality of necked filling openings on said battery; flexible support containers having lower ends secured to each of said necked openings; bracket means for supporting lower ends of said support containers; frangible electrolyte containers positioned within said support containers;

a drying agent contained within each of said support containers; strainer means in said support containers adjacent said lower ends thereof for preventing transfer of particles of said electrolyte containers into said battery; a plurality of hammers; means for supporting said hammers for pivotal movement in said housing, said hammers being adapted for gravitational pivotal movement about said supporting means therefor, first to strike said support containers and through said support containers to strike said electrolyte containers whereby to break at least portions of said electrolyte containers, electrolyte from said broken electrolyte containers being retained in said support containers; bimetallic latch means for retaining said hammers in an uppermost position; and heat inducing means responsive to failure of normal power supplies for releasing said latch means, said battery being thereby automatically filled with electrolyte from said support containers to provide an immediate source of electrical energy.

References Cited in the file of this patent

UNITED STATES PATENTS

| | | |
|---|---|---|
| 1,882,472 | Beetem | Oct. 11, 1932 |
| 2,026,205 | Apostoloff | Dec. 31, 1935 |
| 2,452,049 | Hauck | Oct. 26, 1948 |
| 2,502,723 | Harriss | Apr. 4, 1950 |
| 2,529,511 | Murphy | Nov. 14, 1950 |
| 2,682,567 | Porter | June 29, 1954 |